United States Patent Office.

TREFFLÉ GARCEAU AND EDWARD DE LA GRANJA, OF BOSTON, MASSACHUSETTS.

Letters Patent No. 75,406, dated March 10, 1868.

IMPROVED FABRIC FOR THE MANUFACTURE OF HATS, CAPS, &c.

*The Schedule referred to in these Letters Patent and making part of the same.*

TO ALL WHOM IT MAY CONCERN:

Be it known that we, TREFFLÉ GARCEAU and EDWARD DE LA GRANJA, of Boston, in the county of Suffolk, and State of Massachusetts, have invented a new and useful Improvement in the Manufacture of Hats, Caps, Bonnets, Neck-Ties, and Ribbons; and we do hereby declare the following to be a full, clear, and exact description of the same, sufficient to enable those skilled in the art to which our invention appertains to make use of it.

This invention consists in combining paper-pulp, India rubber, and paraffine in certain proportions, and thereby forming a composition peculiarly adapted to the manufacture of hats, caps, bonnets, neck-ties, ribbons, and other similar articles.

To form this composition, we dissolve India rubber in ether, and melt paraffine by the application of heat until both are in a condition which admits of their being kneaded with paper-pulp into one homogeneous compound. We then take from two to twenty parts of the dissolved India rubber, from one to five parts of paraffine, and one hundred parts of paper-pulp, and thoroughly mix them by kneading or heating, until the whole mass assumes a uniform consistency and becomes homogeneous in character.

In the manufacture of the articles above enumerated, the composition which we have described may be used either alone or in conjunction with some textile fabric, such as stiff muslin, long lawn, cotton or linen cloth, &c., &c. If used in connection with the cloth, it may be spread or rolled upon the cloth by means of an ordinary roller, rolling-press, or machine, and may be prepared in this manner in slabs or smooth boards, of any desired dimensions.

Having thus prepared the material, we next proceed to color it as the fancy may suggest. It will receive the most delicate shades and tints, as well as the most brilliant colors, and may be beautifully embellished with designs of fruits, flowers, leaves, insects, &c.

From the material thus fully prepared, we manufacture hats, caps, and bonnets by compressing it to the proper shape in moulds constructed in different fashions, so as to imitate silks, woollens, plaited straw, or any other material usually employed in the manufacture of such articles. Neck-ties, ribbons, &c., may be made from it in a similar way, cutting and stamping them out with dies so constructed that when the articles are finished they are a perfect imitation of silks, woollens, linen, or any other material used in the manufacture of these and similar articles.

Having thus described our invention, what we claim as new, and desire to secure by Letters Patent, is—

1. The composition above described, substantially as and for the purpose set forth.
2. The process of manufacturing hats, caps, bonnets, neck-ties, and ribbons, substantially as specified.

TREFFLÉ GARCEAU,
EDWARD DE LA GRANJA.

Witnesses:
JOSEPH P. ROGERS,
C. G. THOMAS.